United States Patent
Zeller et al.

(10) Patent No.: US 6,370,209 B1
(45) Date of Patent: Apr. 9, 2002

(54) PROCESS FOR SENSING MANIPULATIONS OF DIGITAL INFORMATION

(75) Inventors: Jürgen Zeller, Ismaning; Heinz Gerhäuser, Waischenfeld, both of (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/297,809

(22) PCT Filed: Nov. 25, 1997

(86) PCT No.: PCT/EP97/06575

§ 371 Date: May 6, 1999

§ 102(e) Date: May 6, 1999

(87) PCT Pub. No.: WO98/32261

PCT Pub. Date: Jul. 23, 1998

Related U.S. Application Data

(63) Continuation of application No. PCT/EP97/06575, filed on Nov. 25, 1997.

(30) Foreign Application Priority Data

Jan. 21, 1997 (DE) .......................................... 197 01 939

(51) Int. Cl.⁷ ................................................. H04L 9/32
(52) U.S. Cl. ...................... 375/343; 380/223; 380/201; 382/115; 382/119
(58) Field of Search ................................ 375/343, 224, 375/340, 349, 342, 240.01, 240.27; 380/231, 233, 201, 210, 223, 225; 713/200, 201; 382/115, 119

(56) References Cited

U.S. PATENT DOCUMENTS

| | | | | |
|---|---|---|---|---|
| 4,805,222 A | * | 2/1989 | Young et al. ................... | 382/2 |
| 5,625,693 A | * | 4/1997 | Rophatgi et al. .............. | 380/23 |
| 5,703,995 A | * | 12/1997 | Willbanks ..................... | 386/52 |
| 5,999,637 A | * | 12/1999 | Toyoda et al. ............... | 382/124 |
| 6,163,644 A | * | 12/2000 | Owashi et al. ................. | 386/46 |
| 6,272,253 B1 | * | 8/2001 | Bannon et al. .............. | 382/236 |

FOREIGN PATENT DOCUMENTS

| | | |
|---|---|---|
| EP | 0 676 877 A2 | 10/1995 |
| EP | 0 752 786 A1 | 1/1997 |

OTHER PUBLICATIONS

K. Mueller, "Ausgewaehlte Sicherheits–und Uebertragungsaspekte der modernen Krytographie (Some Kryptographic ASpects of Security and Communication)", Frequenz, 35, 1981 pp 41–46.

D. Gerberick, "Working Paper Over Functional Specifications for an EDI Cryptoserver", Sigsac Review, vol. 9, No. 3, Jan. 1, 1991, pp. 11–19.

S.M. Matyas, "Digital Signature for Identifying Messages and Sender", IBM Technical Disclosure Bulletin, May 12, 1978, pp 5245–5247.

* cited by examiner

Primary Examiner—Chi Pham
Assistant Examiner—Dung X Nguyen
(74) Attorney, Agent, or Firm—Dougherty & Clements LLP

(57) ABSTRACT

In a method for detecting a manipulation performed on digital information the erroneous determination of a manipulation during processing disturbances is prevented by subdividing the information into information subunits from each of which an identification is derived which is assigned to the respective information subunit. After processing the information subunits together with their identifications, potentially manipulated information subunits are determined on the basis of their identifications. This enables the whole of the information to be classified as manipulated if at least two information subunits which are correlated with respect to time or location have been determined to have been potentially manipulated.

8 Claims, No Drawings

PROCESS FOR SENSING MANIPULATIONS OF DIGITAL INFORMATION

This application is a continuation of PCT application no. PCT/EP97/06575 filed on Nov. 25, 1997, with the Europe Patent Office.

FIELD OF THE INVENTION

The present invention relates to a method for detecting a manipulation performed on digital information. In one application the invention relates to the field of security by video supervision wherein a manipulation of the video recording of the supervised object is to be identified.

1. Description of Background Art

In the security area the practice of providing security by means of video supervision for objects to be protected is known. Here a sequence of video frames is normally transmitted from the supervised object over a suitable long-distance data transmission to a supervision centre. A video supervision of this type can only be protected against manipulations if unauthorized persons are prevented from effecting a manipulation of the transmitted video information in a way which escapes detection, e.g. by replacing the video information currently to be transmitted with video information recorded at a different location and/or at a different time and transmitting this information to the supervision centre. To prevent such unsophisticated manipulation stratagems, the practice of transmitting the video information together with a suitable identification is already known. An example of such an identification is the so-called "electronic signature", known per se, where the electronic signature involves identifications which are obtained from the total frame contents of the video information under supervision by means of a key, data being derived again from the received total video frame contents at the security centre location by means of a suitable additional key, these data corresponding to the electronic signature if no manipulation has occurred. While such a procedure enables a manipulation within the transmitted video information or generally within processed digital information to be identified, it is extremely susceptible to disturbances of any kind in the processing and in particular to disturbances in the transmission of the video information in the special case of video supervision cited above. With this strategy a disturbance in the transmission of just a single frame point suffices for the signature of the processed or received total information to be classified as invalid, so that the processed or received digital total information is classified incorrectly as manipulated.

Similar problems arise not only in the field of securing video sequences against manipulation in the security area so as to identify manipulations on the transmission path of the video information, but generally in any instance of securing digital information against manipulations in its processing by the use of an electronic identification, e.g. in the form of the so-called digital or electronic signature, which is derived from the total content of the information, when disturbances of individual bits occur during the processing. With the concept of the digital signature, such disturbances regularly result in the processed information being incorrectly classified as manipulated.

2. Description of Prior Art

EP 0 752 786 A discloses a method and a device for checking the authenticity of transmitted applications in an interactive information system. An executable interactive program is combined with audio/video data for transmission. The program is subdivided into modules, a directory module being created which combines the program modules. For data security a signed certificate is added to the respective directory modules. The integrity of the respective modules is supervised by subjecting respective modules to a hash coding and by incorporating the respective hash values in the directory module. A hash value of the directory module that contains the other hash values is created, encoded and appended to the directory module. A receiver decodes the certificate and checks it regarding the authenticity of the supplier.

SUMMARY OF THE INVENTION

It is the object of the present invention so to develop further a method employing an identification to detect a manipulation performed on digital information that a faulty classification of the information as manipulated when disturbances occur during processing is prevented or at least happens less frequently.

In accordance with the present invention, this object is achieved by method for detecting a manipulation performed on digital information by means of an identification, comprising the steps of subdividing the information into information subunits of a data size which is so chosen that the probability of an error occurring during the intended processing of these information subunits is less than a predetermined probability; deriving a respective identification from each information subunit; assigning the identification to the respective information subunit; processing the information subunits together with their identifications, where a manipulation or a processing error of the information subunits may occur; determining potentially manipulated processed information subunits on the basis of their identifications; and classifying the information as manipulated if at least two information subunits which are correlated with respect to time or location have been determined to have been potentially manipulated.

According to an aspect of the invention the method comprises the following step after the step of determining potentially manipulated information subunits:

reproducing the information subunits determined not to have been potentially manipulated and the information subunits determined to have been potentially manipulated in such a way that the correlation with respect to time or location of the information subunits determined to have been manipulated can be identified from the reproduction so as to enable the operative to identify the total information as manipulated in the event of correlation with respect to time or location of the information subunits which have been determined to have been manipulated.

DETAILED DESCRIPTION OF PREFERRED EMBODIMENTS

The invention is based on the idea of departing from the derivation of an electronic signature from the total information customary in the prior art and to first divide the total information into information subunits from each of which an individual identification is derived which is assigned to these information subunits, where after processing the information subunits and their identifications, e.g. in the form of a transmission of the same, potentially manipulated information subunits are determined on the basis of identifications which do not belong to them, in particular on the basis of information subunit signatures which a reidentified as invalid. The method according to the present invention thus divides the total information to be supervised into information subunits classified as valid and information subunits classified as potentially manipulated. The invention hereby makes it possible to undertake for the first time, through the correlation with respect to time or location of the information subunits determined to have been potentially manipulated, an automatic determination or determination by an evaluation system's observer with the aim of assigning potentially manipulated information subunits which are uncorrelated with respect to time or location as unmanipulated to total information which is unmanipulated as a whole, whereas if there is a correlation with respect to time or location of the information subunits determined to have been potentially manipulated, the total information is registered as manipulated.

The concept according to the present invention assumes that the disturbances in the information occurring as a result of transmission errors or other processing errors occur statistically and are thus not correlated with respect to time or location, whereas in the case of a deliberate manipulation of information there is nearly always a correlation with respect to time and a correlation with respect to location among the information subunits which have been manipulated.

In the case of a video frame at least one frame area, which comprises a number of video frame subunits, will have to be manipulated simultaneously for the duration of a number of video frames in order e.g. in the case of security supervision to prevent a particular unauthorized undertaking at the supervised object being communicated to the security centre. In this case it is possible when representing the supervised object in the security centre to optically mark the frame subareas determined to have been potentially manipulated so that the person observing the frame can identify the manipulation performed on the video frame from the location relationship or juxtaposition of the optically enhanced potentially manipulated video frame areas and can distinguish it without difficulty from a disturbance which is only occurring statistically.

It is, of course, also possible to determine automatically the correlation with respect to time and/or location of the information subunits which have been classified as partially manipulated and thus produce a suitable manipulation disturbance message.

A digital or electronic signature which is derived from the information contents of the information subunit through encoding by means of a key, preferably a private key, may be used as the identification which is assigned to the respective information subunits in the subject matter of the invention.

To determine, after processing the information subunit, whether the information subunit is to be classified as potentially manipulated or not, it can be decoded by means of an appropriate key, preferably a so-called public key, in order to then determine the validity or invalidity of the digital signature assigned to the information subunit. Such encoding and decoding strategies are known in the prior art per se in connection with the so-called digital signature.

Increased security in the invention can be achieved if the identification assigned to the information subunits also includes an auxiliary identification. The auxiliary identification can be time information or location information. The time information can e.g. be supplied from an internal clock of a video camera in the case of the application of the invention to long-distance video supervision. For this application the internal clock of the video camera must be adjusted precisely during manufacture or installation of the camera, the clock being so implemented that a time-of-day correction in the sense of a calibration of only a few seconds within a time period of e.g. six months is made possible. Increased manipulation security is achieved by comparing the time-of-day data of the video camera clock with a simultaneously calibrated clock at the receiver location.

It is also possible to use as the auxiliary information location information, supplied e.g. by the GPS location system.

In a preferred implementation of the application of the method according to the present invention to the video supervision strategy already discussed, the following procedure is adopted:

In contrast to the prior art, an electronic signature is assigned not to a sequence of video frames but to a respective subarea of the video frame, as has already been explained, this electronic signature also being supplemented with a so-called time stamp and a location stamp, i.e. with the auxiliary information on time and location already discussed.

By preference a DCT (discrete cosine transform) for determining corresponding coefficients is calculated for each frame for a block of 16×16 frame points. Rounding is employed here so that only low-frequency contributions are retained and these are only created with half the original resolution. For each block of 4×4 of the coefficients calculated by the DCT a signature is generated and transmitted together with the coefficient block. This partitioning results in a subdivision of the total video frame into 6336 frame subareas. For each of these frame subareas it is determined on the receive side on the basis of the signature to the cited coefficient block whether a potential manipulation has taken place. If e.g. a potential manipulation is determined simultaneously in a number of neighbouring frame subareas or in a number of successive frame subareas, total manipulation of the frame contents can be assumed to have occurred. On the other hand the typical error quota leads to the total video frame being classified as manipulated only to an extent which is no longer statistically relevant, as can be seen from the following numbers: for a recording time of an hour a transmission over a transmission channel with a bit error probability of 1e-8 is assumed. It is assumed that the transmission takes place in a compressed video format with a data rate of 2 Mbit/s. With the cited bit error rate about 38 erroneous bits are to be expected during an hour's video recording. A signature of the complete document, i.e. of the hour long video recording, would to a high degree of probability always be classified as invalid, whereas it can be practically ruled out that the 38 transmission errors occur correlated with respect to time or location on a single video frame or a few video frames in a sequence.

By preference a weighting factor which indicates the degree of permissible erroneousness of the processed information subunit is assigned to each of the respective information subunits, the relevant information subunit being classified as potentially manipulated if the information-subunit-specific erroneousness is exceeded. For the example of the video frame the weighting factor is chosen according to the importance of the information subunit. If e.g. the contents of the video frame subunit consist of an account number, the weighting factor will be so chosen that no erroneousness is permitted. On the other hand if the information subunit consists e.g. of the photo of a person to whom the account belongs, a relatively tolerant erroneousness will be chosen.

The method according to the present invention has been explained, by way of example, with reference to the field of security video supervision.

For the person skilled in the art it is clear that the information to be secured against manipulation is not confined to the field of video supervision but can be any sort of information to be processed for which protection against manipulation is necessary during processing. Thus the information might be the contents of a book. In this case what the method according to the present invention requires is not generation of the identification on the basis of the contents of the whole book but of respective identifications on the basis of the contents of a paragraph of a chapter of the book. Here the text can be converted from its original representation into a format-free representation, e.g. into the form of an ASCII text without punctuation, without upper and lower case letters, without paragraphs, etc., within which the individual words are separated only by a single code character.

It is possible here to reduce the amount of information to be signed. This may be necessary if the available computer capacity is limited, as is often the case in practice.

For example, in the case of a pure ASCII text every second letter of a word can be removed prior to transmission provided that there is no second word with the same root which contains the same abbreviation. This text reduction can be regarded as analoguous to the quantity adaptation in the video field described above, wherein the DCT coefficients are each divided by 4 so as to save two bit storage locations per coefficient. It is obvious that such a reduction of the DCT coefficients entails a coarsening of the location frequency representation, i.e. the frame in the location domain will become coarser, without changing the contents substantially, however.

In a further deviation from the embodiment described above the information to be secured against manipulation may also be digitalized values of acoustic signals. Here an identification or electronic signature is assigned to each group of sampled values of the signal, the potential manipulation of each group of sampled values being determined at the receiving location. If a number of sampled values in a time sequence are determined to have been potentially manipulated, for example, it can be concluded that total manipulation of the acoustic signal has occurred during its transmission.

What is claimed is:

1. A method for detecting a manipulation performed on digital information by means of an identification, comprising the following method steps:

subdividing the information into information subunits of a data size which is so chosen that the probability of an error occurring during the intended processing of these information subunits is less than a predetermined probability;

deriving a respective identification from each information subunit;

assigning the identification to the respective information subunit;

processing the information subunits together with their identifications, where a manipulation or a processing error of the information subunits may occur;

determining potentially manipulated processed information subunits on the basis of their identifications; and classifying the information as manipulated if at least two information subunits which are correlated with respect to time or location have been determined to have been potentially manipulated.

2. A method according to claim 1, comprising the following method step after the method step of determining potentially manipulated information subunits:

reproducing the information subunits determined not to have been potentially manipulated and the information subunits determined to have been potentially manipulated in such a way that the correlation with respect to time or location of the information subunits determined to have been manipulated can be identified from the reproduction so as to enable the operative to identify the total information as manipulated in the event of correlation with respect to time or location of the information subunits which have been determined to have been manipulated.

3. A method according to claim 1 or 2, wherein the identification assigned to the information subunit is an electronic signature which is derived from the information contents of the information subunit by means of a key.

4. A method according to claim 3, wherein a potentially manipulated information subunit is determined by decoding it by means of an additional key, whereupon the decoded information is compared with the electronic signature.

5. A method according to claim 1, wherein at least some of the identifications assigned to the information subunits include an auxiliary identification as well.

6. A method according to claim 5, wherein the auxiliary identification is time information associated with the information subunit.

7. A method according to claim 5, wherein the auxiliary identification is location information associated with the information subunit.

8. A method according to claim 1, wherein a weighting factor which indicates the degree of permissible erroneousness of the information subunit is assigned to each of the respective information subunits, the relevant information subunit being classified as potentially manipulated if the information-subunit-specific erroneousness is exceeded.

* * * * *